United States Patent
Tweedy

(10) Patent No.: US 11,313,503 B2
(45) Date of Patent: Apr. 26, 2022

(54) THREADED TUBULAR END PROTECTOR

(71) Applicant: Tweedy's Speed Protectors, LLC, Eufaula, OK (US)

(72) Inventor: Neil E. Tweedy, Henryetta, OK (US)

(73) Assignee: Tweedy's Speed Protectors, LLC, Eufaula, OK (US)

( * ) Notice: Subject to any disclaimer, the term of this patent is extended or adjusted under 35 U.S.C. 154(b) by 0 days.

(21) Appl. No.: 17/360,641

(22) Filed: Jun. 28, 2021

(65) Prior Publication Data
US 2021/0404586 A1 Dec. 30, 2021

Related U.S. Application Data

(60) Provisional application No. 63/045,317, filed on Jun. 29, 2020.

(51) Int. Cl.
*F16L 35/00* (2006.01)

(52) U.S. Cl.
CPC .................... *F16L 35/00* (2013.01)

(58) Field of Classification Search
CPC ................ F16L 35/00; B65D 59/06
USPC .......................... 138/96 T; 220/288
See application file for complete search history.

(56) References Cited

U.S. PATENT DOCUMENTS

| | | | | |
|---|---|---|---|---|
| 676,976 A * | 6/1901 | Bossert | ............ | H01R 4/20 |
| | | | | 138/96 T |
| 1,457,882 A * | 6/1923 | Shrum | ............ | F16L 57/005 |
| | | | | 138/96 T |
| 1,639,814 A * | 8/1927 | Shrum | ............ | B65D 59/06 |
| | | | | 138/96 T |
| 1,692,710 A * | 11/1928 | Spahn | ............ | H02G 3/06 |
| | | | | 220/288 |
| 1,774,569 A | 9/1930 | Shrum | | |
| 2,156,169 A * | 4/1939 | Unke | ............ | B65D 59/06 |
| | | | | 138/96 T |
| 2,977,993 A * | 4/1961 | Scherer | ............ | B65D 59/00 |
| | | | | 138/96 T |
| 4,185,665 A * | 1/1980 | Flimon | ............ | E21B 17/006 |
| | | | | 138/89 |
| 4,210,179 A * | 7/1980 | Galer | ............ | B65D 59/06 |
| | | | | 138/96 T |
| 4,733,888 A | 3/1988 | Toelke | | |
| 5,148,835 A * | 9/1992 | Clark | ............ | B65D 59/06 |
| | | | | 138/96 R |
| 5,303,743 A | 4/1994 | Vincent | | |
| 6,196,270 B1 | 3/2001 | Richards et al. | | |

(Continued)

OTHER PUBLICATIONS

PCT/US2021/039400; "International Search Report and Written Opinion"; dated Oct. 6, 2021; 10 pages.

*Primary Examiner* — Patrick F Brinson
(74) *Attorney, Agent, or Firm* — Hall Estill Law Firm

(57) ABSTRACT

A thread protector that has an external sleeve having threads disposed on an inner side to engage with pin threads disposed on a pin end of a tubular member. The thread protector also has a flange disposed on a first end of the external sleeve to engage with the pin end of the tubular member, the threads on the inner side of the external sleeve are disposed axially adjacent to the flange and radially adjacent to the end of the pin end of the tubular member. A method of protecting the pin threads of the pin ends of the tubular members. The method includes screwing the thread protector on the pin threads of the pin end of the tubular member.

19 Claims, 3 Drawing Sheets

(56) References Cited

U.S. PATENT DOCUMENTS

| 9,151,432 | B1 |     | 10/2015 | Yoder    |           |
|-----------|----|-----|---------|----------|-----------|
| 9,546,029 | B1 |     | 1/2017  | Keevert  |           |
| 9,631,666 | B1 |     | 4/2017  | Colford  |           |
| 2016/0039585 | A1 | * | 2/2016 | Danneffel | B65D 59/06 |
|           |    |     |         |          | 138/96 T  |
| 2019/0368281 | A1 | * | 12/2019 | Haggart | E21B 19/02 |

* cited by examiner

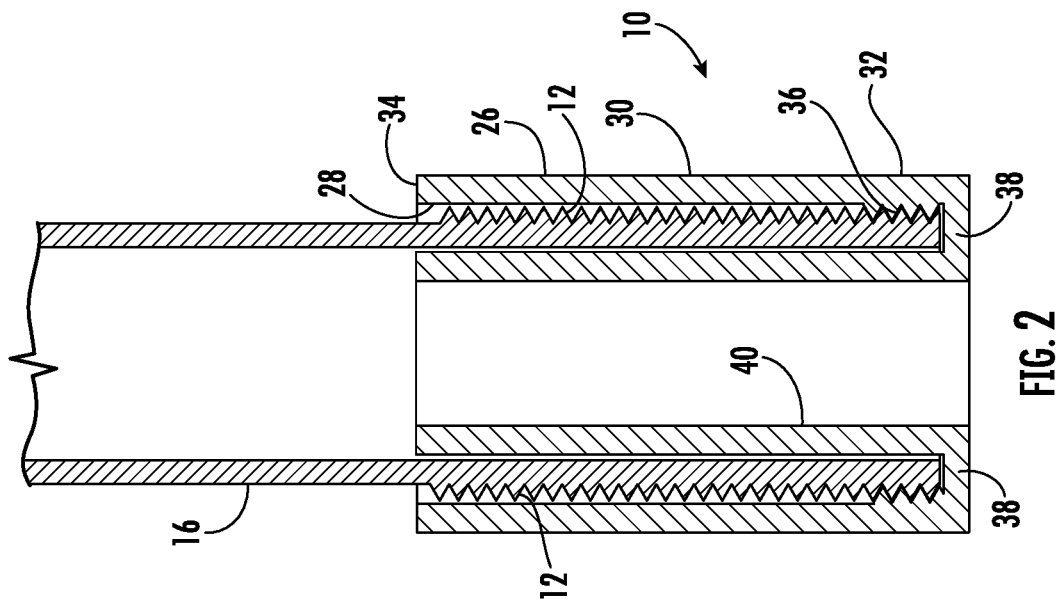
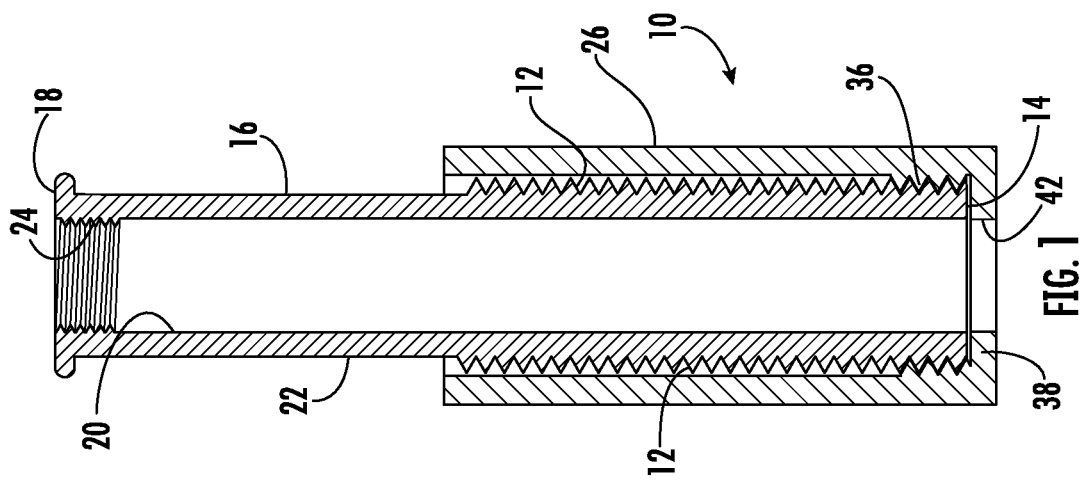

THREADED TUBULAR END PROTECTOR

CROSS-REFERENCE TO RELATED APPLICATIONS

The present application is a conversion of U.S. Provisional application having U.S. Ser. No. 63/045,317, filed Jun. 29, 2020, which claims the benefit under 35 U.S.C. 119(e). The disclosure of which is hereby expressly incorporated herein by reference.

STATEMENT REGARDING FEDERALLY SPONSORED RESEARCH OR DEVELOPMENT

Not applicable.

BACKGROUND OF THE DISCLOSURE

1. Field of the Disclosure

The present disclosure relates to a thread protector for a threaded end of a unit of casing or tubing that can be quickly attached to and removed from the unit of casing or tubing. The present disclosure also relates to a method of attaching or removing the thread protectors from the pin end of the units of casing or tubing.

2. Description of the Related Art

Casing and/or tubing have a pin end and a box end. The box end includes threads inside, which are naturally protected by being disposed inside the tubing or casing. The pin end has threads on the outside of the tubing or casing that are exposed and can be damaged. Currently, there are protective devices for the pin end threads of the tubing or casing but they take a considerable amount of time to put on the tubing or casing and remove from the tubing or casing. When you multiply the time it takes to put on or remove a typical protector device from the pin end threads of multiple units of tubing or casing, it results in a large amount of time. This large amount of time is taken directly from production time of an oil or gas well.

Accordingly, there is a need for a thread protector for the threads of the pin end of the tubing or casing that can be more quickly placed on and/or removed from the pin end of the tubing or casing, but still protects all the threads of the pin end of the tubing or casing.

SUMMARY OF THE DISCLOSURE

The present disclosure is directed toward a thread protector that has an external sleeve having threads disposed on an inner side to engage with pin threads disposed on a pin end of a tubular member. The thread protector also has a flange disposed on a first end of the external sleeve to engage with the pin end of the tubular member, the threads on the inner side of the external sleeve are disposed axially adjacent to the flange and radially adjacent to the end of the pin end of the tubular member.

The present disclosure is also directed toward a method of protecting pin threads of pin ends of tubular members. The method includes screwing the thread protector on pin threads of a pin end of a tubular member.

BRIEF DESCRIPTION OF THE DRAWINGS

FIG. 1 is a cross-sectional view of a thread protector constructed in accordance with the present disclosure.

FIG. 2 is a cross-sectional view of another embodiment of the thread protector constructed in accordance with the present disclosure.

DETAILED DESCRIPTION OF THE DISCLOSURE

Figure 3B:
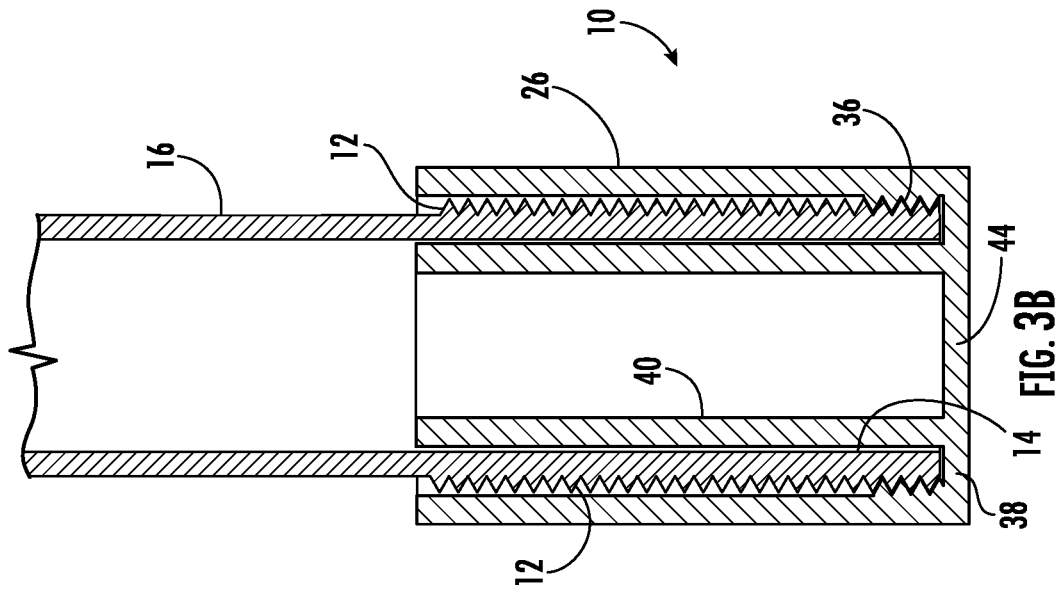
FIG. 3B is a cross-sectional view of a further embodiment of the thread protector constructed in accordance with the present disclosure.
Figure 3A:
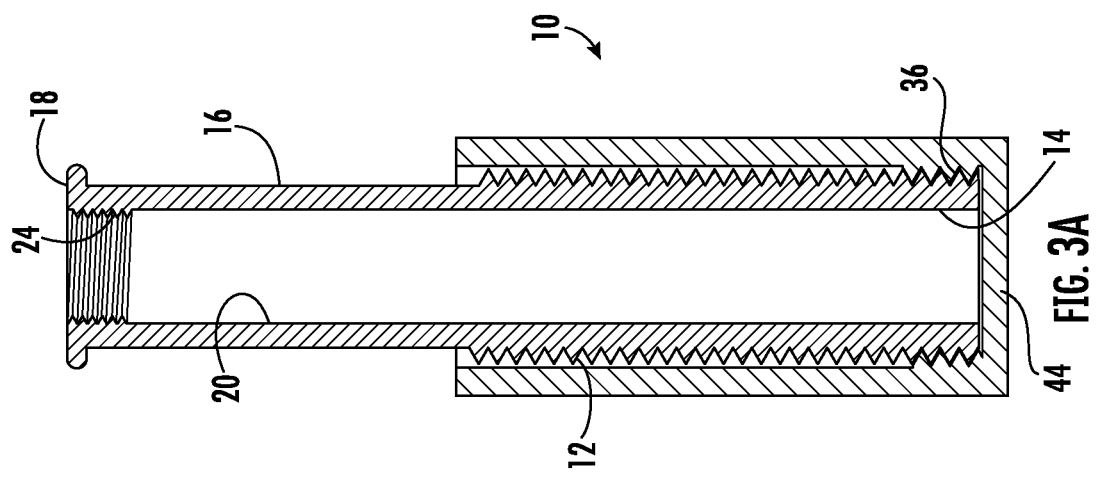
FIG. 3A is a cross-sectional view of yet another embodiment of the thread protector constructed in accordance with the present disclosure.

The present disclosure is directed to a thread protector 10 to guard or protect threads 12 on a pin end 14 of a tubular member 16. The tubular member 16 can be casing or tubing used in an oil and gas operation. The tubular member 16 also includes a box end 18 opposite the pin end 14, an internal side 20 and an external side 22. The box end 18 of the tubular member 16 includes internal threads 24 disposed therein on the internal side 20 of the tubular member 16. The threads 12 disposed on the external side 22 of the pin end 18 of the tubular member 16 can be a certain number of threads or extend along a certain length of the tubular member 16.

The thread protector 10 includes an external sleeve 26 that is sized to fit around the external side 22 of the tubular member 16 and have a length that is at least as long as the length of the threads 12 disposed on the pin end 14 of the tubular member 14. The external sleeve 26 can have an inner side 28, an outer side 30, a first end 32, and a second end 34. The inner side 28 of the external sleeve 26 can include at least one thread 36 to engage with the threads 12 disposed on the pin end 14 of the tubular member 16.

In one embodiment of the present disclosure, the thread protector 10 can also include a flange 38 inwardly directed in a radial direction from the first end 32 of the thread protector 10. The flange 38 is positioned so that the pin end 14 of the tubular member 16 can engage the flange 38 to maintain the thread protector 10 in a protective position with respect to the threads 12 on the pin end 14 of the tubular member 16. In another embodiment, an internal sleeve 40 can extend from an inner diameter 42 of the flange 38 in the same direction of the external sleeve 26 of the thread protector 10. The internal sleeve 40 is sized to extend back into the inside of the tubular member 16 to provide additional structural support for the thread protector 10. In another embodiment, a plate 44 can be attached to the first end 32 of the external sleeve 26 instead of the flange 38 to prevent debris from getting inside the tubular member 16 when the tubular member 16 is not in use.

The inner side 28 of the external sleeve 26 of the thread protector 10 can have any number of consecutive threads such that the thread protector 10 can be quickly removed and/or replaced from the tubular member 16. The threads 12 disposed on the inner side 28 of the external sleeve 26 of the thread protector 10 are positioned close to the flange 38 of the thread protector 10 so that when the thread protector 10 engages with the threads 12 of the pin end 14, the threads 12 of the thread protector 10 only engage with the threads 12 at the end of the pin end 14 of the tubular member 16. If a limited number of the threads on the tubular member 16 are engaged to secure the thread protector 10 thereto, then the reduction in time it would take to remove the thread protector 10 from the tubular member 16, and the time it would take to secure the thread protector 10 to the tubular member 16, when combined for numerous tubular members, would be significant.

In one embodiment, the number of threads 12 on the inner side 28 of the external sleeve 26 of the thread protector 10 can be less than ten threads. In another embodiment, the number of threads 12 on the inner side 28 of the external sleeve 26 of the thread protector 10 can be less than eight threads. In a further embodiment, the number of threads 12 on the inner side 28 of the external sleeve 26 of the thread protector 10 can be less than 6 threads. In yet another embodiment, the number of threads 12 on the inner side 28 of the external sleeve 26 of the thread protector 10 can be less than 4 threads. In another embodiment, the number of threads 12 on the inner side 28 of the external sleeve 26 of the thread protector 10 can be less than 3 threads. In a further embodiment, the number of threads 12 on the inner side 28 of the external sleeve 26 of the thread protector 10 can be less than 2 threads.

The threads 12 on the pin end 14 of the tubular member 16 can extend along a certain length of the tubular member 16. The engaged threads (threads extending from the end of the pin end of the tubular member that are engaged by the threads of the thread protector) extend a certain percentage of the length of all the threads 12 on the pin end 14 of the tubular member 16. In one embodiment, the length of the engaged threads are less than about 40 percent of the total length of all the threads 12 on the pin end 14 of the tubular member 16. In another embodiment, the length of the engaged threads are less than about 30 percent of the total length of all the threads 12 on the pin end 14 of the tubular member 16. In a further embodiment, the length of the engaged threads are less than about 25 percent of the total length of all the threads 12 on the pin end 14 of the tubular member 16. In yet another embodiment, the length of the engaged threads are less than about 20 percent of the total length of all the threads 12 on the pin end 14 of the tubular member 16. In an even further embodiment, the length of the engaged threads are less than about 10 percent of the total length of all the threads 12 on the pin end 14 of the tubular member 16. In another embodiment, the length of the engaged threads are less than about 5 percent of the total length of all the threads 12 on the pin end 14 of the tubular member 16.

Figure 6:
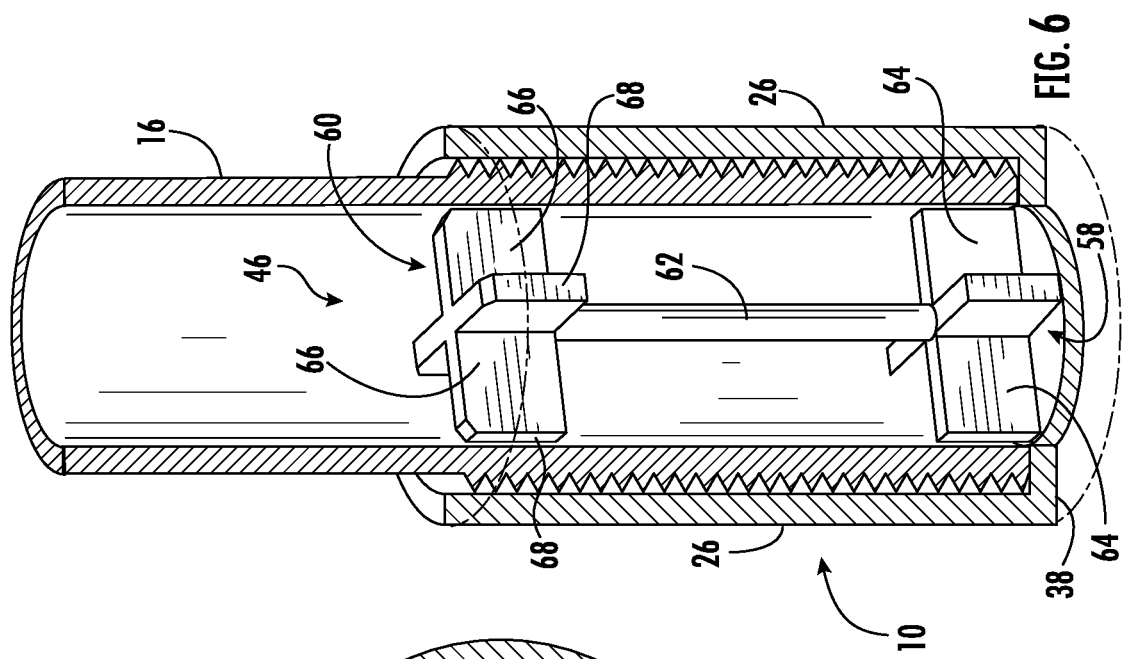
FIG. 6 is a perspective view of a portion of yet another embodiment of a thread protector constructed in accordance with the present disclosure.
Figure 5:
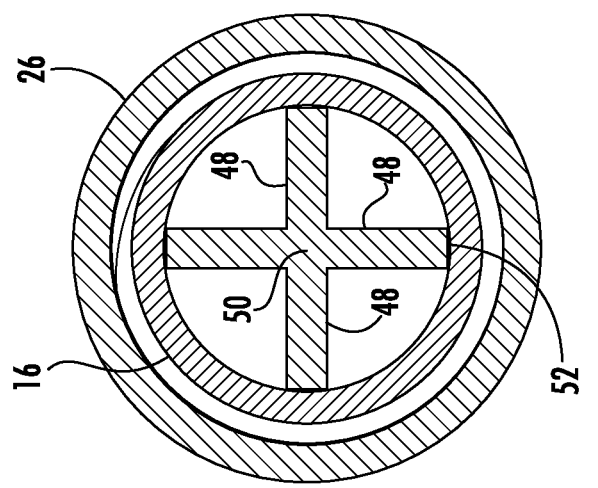
FIG. 5 is a cross-sectional view of the thread protector shown in FIG. 4 and constructed in accordance with the present disclosure.
Figure 4:
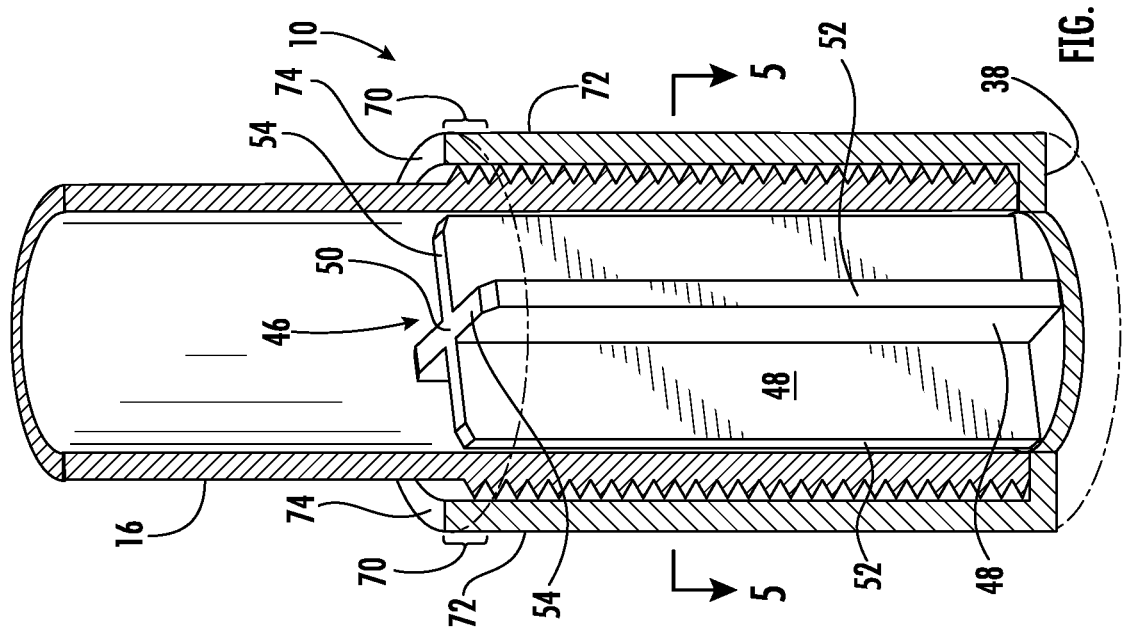
FIG. 4 is a perspective view of a portion of another embodiment of a thread protector constructed in accordance with the present disclosure.

Referring now to FIGS. 4-6, shown therein is a thread protector 10 that has a securing apparatus 46 that can extend inside the tubular member 16 from the flange 38. The securing apparatus 46 can engage with the inside of the tubular member 16 to maintain position of the thread protector 10 relative to the threads 12 of the pin end 14 of the tubular member 16. The securing apparatus 46 can have any size and shape such that it maintains the thread protector 10 in place on the tubular member 16. In one embodiment, the securing apparatus 46 can include a plurality of fins 48 that extend from a central member 50. The fins 48 have outer portions 52 that can engage with the inner side of the tubular member 16. The fins 48 have terminal ends 54 on the opposite ends from the flange 38. The outer portion 52 at the terminal ends 54 of the fins 48 can be tapered so that insertion of the securing apparatus 46 of the thread protector 10 is easier to extend down into the tubular member 16. The length, width and height of the fins 48 can be varied such that the thread protector 10 functions as intended. The securing apparatus 46 can also have any number of fins 48 such that the thread protector 10 functions as intended. In various embodiments, the securing apparatus 46 can have more than two fins 48, more than three fins 48, more than four fins 48 or five or more fins 48.

In another embodiment shown in more detail in FIG. 6, the securing apparatus 46 can have a first spoke end 58 that is attached to the flange 38, a second spoke end 60 that is separated from the first spoke end 58 via a rod member 62. The first and second spoke ends 58 and 60 engage the inside of the tubular member 16 to hold the thread protector 10 securely in place. The first spoke end 58 can have any desired number of spokes 64 so that the thread protector 10 operates as intended. Similarly, the second spoke end 60 can have any desired number of spokes 66 so that the thread protector 10 operates as intended. A portion of the outer surfaces 68 of the spokes 66 can be tapered to facilitate insertion of the securing apparatus 46 into the tubular member 16. The securing apparatus 46 can be used with our without the at least one thread 36 on the inner side 28 of the external sleeve 26 of the thread protector 10. The spoke and fin designs of the securing apparatus 46 allow for visual inspection of the inner part of the tubular member 16 and cleaning of the inside part of the tubular member 16.

In yet another embodiment, the thread protector 10 can have a ridge or lip 70 disposed on an outer surface 72 of the external sleeve 26 close to a terminal end 74 of the external sleeve. The ridge 70 allows for engagement by a band that can extend to the tubular member 16 to help hold the thread protector 10 in position, such as during transportation of the tubular members 16 to and from job sites or while the tubular members 16 are being stored. The band that can be used can extend around the entire circumference of the thread protector 10 and the tubular member. Primarily, ridge 70 prevents the band from sliding off of the thread protector 10 and the band prevents the thread protector 10 from rotating off of the tubular member 16.

The present disclosure is also directed toward a method of removing the thread protectors 10 from the tubular members 16 and using the tubular members 16 in various oil and gas operations. The method is also directed towards securing the thread protectors 10 to the tubular members 16 that are being used in the oil and gas operations.

From the above description, it is clear that the present disclosure is well-adapted to carry out the objectives and to attain the advantages mentioned herein as well as those inherent in the disclosure. While presently preferred embodiments have been described herein, it will be understood that numerous changes may be made which will readily suggest themselves to those skilled in the art and which are accomplished within the spirit of the disclosure and claims.

What is claimed is:

1. A thread protector, the thread protector comprising:
an external sleeve having threads disposed on an inner side to engage with pin threads disposed on a pin end of a tubular member;
a flange disposed on a first end of the external sleeve to engage with the pin end of the tubular member, the threads on the inner side of the external sleeve are disposed axially adjacent to the flange and radially adjacent to the end of the pin end of the tubular member; and
a securing apparatus extending from the flange.

2. The thread protector of claim 1 wherein the securing apparatus includes fins or spokes to engage an inside portion of the tubular member to secure the thread protector in position on the tubular member.

3. The thread protector of claim 1 wherein the threads on the inner side of the external sleeve include less than 4 threads.

4. The thread protector of claim 1 wherein the threads on the inner side of the external sleeve extend an axial length along the external sleeve that is less than about 25 percent of the length of the pin threads disposed on the pin end of the tubular member.

5. The thread protector of claim 1 wherein the threads on the inner side of the external sleeve extend an axial length along the external sleeve that is less than about 10 percent of the length of the pin threads disposed on the pin end of the tubular member.

6. The thread protector of claim 1 wherein the threads on the inner side of the external sleeve extend an axial length along the external sleeve that is less than about 5 percent of the length of the pin threads disposed on the pin end of the tubular member.

7. The thread protector of claim 1 wherein flange disposed on the first end of the external sleeve extends inward in a radial direction from the external sleeve a portion of a radius of the internal diameter of the pin end of the tubular member.

8. The thread protector of claim 7 wherein flange disposed on the first end of the external sleeve extends inward in a radial direction from the external sleeve the full radius of the internal diameter of the pin end of the tubular member.

9. The thread protector of claim 7 wherein the thread protector includes an internal sleeve that extends from the flange and extends into an inside of the tubular member.

10. The thread protector of claim 1 wherein the external sleeve extends a length that is at least as long as the length of the pin threads disposed on the pin end of the tubular member.

11. A method of protecting pin threads of pin ends of tubular members, the method comprising:
   screwing a thread protector on pin threads of a pin end of a tubular member, the thread protector comprising:
      an external sleeve having threads disposed on an inner side to engage with pin threads disposed on a pin end of a tubular member;
      a flange disposed on a first end of the external sleeve to engage with the pin end of the tubular member, the threads on the inner side of the external sleeve are disposed axially adjacent to the flange and radially adjacent to the end of the pin end of the tubular member; and
      a securing apparatus extending from the flange.

12. The method of claim 11 wherein the threads on the inner side of the external sleeve include less than 4 threads.

13. The method of claim 11 wherein the threads on the inner side of the external sleeve extend an axial length along the external sleeve that is less than about 25 percent of the length of the pin threads disposed on the pin end of the tubular member.

14. The method of claim 11 wherein the threads on the inner side of the external sleeve extend an axial length along the external sleeve that is less than about 10 percent of the length of the pin threads disposed on the pin end of the tubular member.

15. The method of claim 11 wherein the securing apparatus includes fins or spokes to engage an inside portion of the tubular member to secure the thread protector in position on the tubular member.

16. The thread protector of claim 1 wherein flange disposed on the first end of the external sleeve extends inward in a radial direction from the external sleeve a portion of a radius of the internal diameter of the pin end of the tubular member.

17. The thread protector of claim 16 wherein flange disposed on the first end of the external sleeve extends inward in a radial direction from the external sleeve the full radius of the internal diameter of the pin end of the tubular member.

18. The thread protector of claim 16 wherein the thread protector includes an internal sleeve that extends from the flange and extends into an inside of the tubular member.

19. The method of claim 11 wherein the external sleeve extends a length that is at least as long as the length of the pin threads disposed on the pin end of the tubular member.

* * * * *